Patented Feb. 13, 1923.

1,445,167

UNITED STATES PATENT OFFICE.

HERMANN PLAUSON, OF HAMBURG, GERMANY.

PROCESS FOR THE MANUFACTURE OF PHOSPHATE MANURES.

No Drawing.  Application filed Janaury 13, 1921. Serial No. 437,118.

*To all whom it may concern:*

Be it known that I, HERMANN PLAUSON, a citizen of Esthonia, residing in Hamburg, Germany, have invented certain new and useful Improvements in Processes for the Manufacture of Phosphate Manures (for which I have filed an application in Germany Nov. 5, 1919), of which the following is a specification.

It is known that crude rock phosphates of various kinds and origins are not employed direct as manures but are first chemically treated by sulphuric acid when the insoluble mineral phosphates which have no manurial value are made soluble and thus converted into a form which can be used by the plants.

It has been found that the solubility is not so fundamentally important as is at present considered to be the case by agriculturalists. My experiments have demonstrated on the contrary that soluble superphosphate is very soon converted into insoluble phosphate in the soil so that it is only present in the soluble form for a very short time. But it has further been found that the solubility of superphosphate is not the chief reason for its ready absorption by plants. My experiments lead to the conclusion that the chief reason for the value of superphosphate is that the soluble phosphate comes intimately in contact with the soil while in the dissolved state and that it is then precipitated in an extremely fine state of division. As a result of this latter distribution therefore, better results are always obtained with initially soluble phosphate than with insoluble phosphates even if these are applied to the soil in the form of a very fine powder. For this reason it has hitherto been necessary to perform the tedious operation of treatment with sulphuric acid which considerably increases the price.

The present invention is based on the above observations. According to the invention the phosphate is transformed into a finely divided or almost colloidal state when it is found that the problem can be solved in a simple and cheap manner.

The crude phosphate is treated in a suitable disintegrator intensively with a large quantity of water to which a small quantity of sulphuric acid or alkali is preferably added. The so-obtained colloidal phosphate is an excellent manure equal to soluble phosphates in value after it has been concentrated without further treatment with acids.

It has been discovered that this treatment with substantially pure water gives rise to a new phenomenon viz, a kind of hydration of the extremely finely divided crude phosphate and that such hydrated phosphates are taken up by plants as easily as water-soluble phosphates. The hydration can be considerably improved and accelerated by the addition of 0.1 to 3% of acid.

*Example.*

100 parts of insoluble slag phosphate previously ground in a phosphate mill are disintegrated in presence of 600 parts of water in a mill provided with beaters or the like or a grinding mill for from one half to two hours. The disintegration or grinding is performed at extremely high speed, for instance in the mill described in our co-pending application No. 437,117 (Case 14). The material to be treated may be continuously circulated with water through the disintegrator till the phosphate has been converted into an extremely fine, dispersed state, so that the particles remain suspended in water for a long time. This mixture is allowed to stand in suitable vessels and weakly acidified by the addition of small quantities of liquid or gaseous acid. After standing for one half to two hours according to the kind of slag, two layers are formed; a phosphate mud below, and water above. The water is drawn off and the mud is separated from the remainder of the water by filter presses or by other filtering apparatus either cold or hot or by centrifugalization and it is then dried preferably by blowing hot air thereover or by heating with waste gases or vapour. The product can also be dried by exposure to dry air with good ventilation.

The water can be used again. The relative quantities of phosphate and water can be varied. The assimilability is still further improved by the addition of 0.1 to 3% of sulphuric acid, nitric acid, phosphoric acid or the like. Other mineral phosphates can be treated in the same way as slag phosphates and bone meal, guano or the like can be used and readily transformed into an easily assimilable product of high value. The process can be facilitated and shortened by heating to about 90–95° C. during hydration. Other substances which appear to act as protective colloids can also be added to facilitate conversion into the colloidal state, e. g. tannin, salts of lysalbinic acid, alkali salts of humic acid, etc.

The action of the water is facilitated if the disintegration is performed under pressure and/or with heat.

It was not known that insoluble phosphates of all kinds could be transformed into a new physical condition which appears to be colloidal in nature, by treatment with water alone or in presence of small quantities of sulphuric acid or other additions, and that in this way insoluble phosphates could be made of equal or almost equal value as compared with soluble superphosphates. A further important feature of the invention is the facilitation of this process by heat or pressure.

Having now particularly described and ascertained the nature of my said invention and in what manner the same is to be performed, I declare that what I claim is:—

1. A process of treating insoluble phosphates which comprises intensively mechanically disintegrating the phosphate in presence of a large quantity of water containing a small quantity of acid.

2. A process of treating insoluble phosphates which comprises intensively mechanically disintegrating the phosphate in presence of a protective colloid.

3. A process of treating insoluble phosphates which comprises intensively mechanically disintegrating the phosphate in presence of a large quantity of water and a small quantity of a substance capable of accelerating the dispersion.

4. A process of treating insoluble phosphates which comprises intensively mechanically disintegrating the phosphate in presence of a large quantity of water with the aid of pressure.

In witness whereof, I have hereunto signed my name this 30 day of Dec. 1920, in the presence of two subscribing witnesses.

HERMANN PLAUSON.

Witnesses:
  VICTOR ARMSTRONG,
  W. H. BEESTON.